United States Patent
Schelling

(10) Patent No.: US 6,954,864 B2
(45) Date of Patent: Oct. 11, 2005

(54) METHOD AND APPARATUS FOR REMOTELY PLACING A COMPUTING DEVICE INTO A LOW POWER STATE

(75) Inventor: Todd A. Schelling, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 10/112,617

(22) Filed: Mar. 29, 2002

(65) Prior Publication Data

US 2003/0188207 A1 Oct. 2, 2003

(51) Int. Cl.[7] .................................................. G06F 1/32
(52) U.S. Cl. ........................................ 713/310; 713/320
(58) Field of Search ................................ 713/300–320, 713/322–324; 709/208, 209, 222

(56) References Cited

U.S. PATENT DOCUMENTS

| | | | | | |
|---|---|---|---|---|---|
| 5,652,892 | A | * | 7/1997 | Ugajin | 713/310 |
| 5,938,771 | A | * | 8/1999 | Williams et al. | 713/310 |
| 6,119,228 | A | * | 9/2000 | Angelo et al. | 713/180 |
| 6,122,748 | A | * | 9/2000 | Hobson | 713/323 |
| 6,393,570 | B1 | * | 5/2002 | Henderson et al. | 713/310 |
| 6,654,896 | B1 | * | 11/2003 | Saunders et al. | 713/323 |
| 2002/0002582 | A1 | * | 1/2002 | Ewing et al. | 709/202 |

* cited by examiner

*Primary Examiner*—Dennis M. Butler
(74) *Attorney, Agent, or Firm*—David L. Guglielmi

(57) ABSTRACT

A method and apparatus for asserting a signal that does one or more of (a) causing the computing device to enter a low power state, (b) turning the computing device off completely, or (c) resetting the computing device, in response to a received request from a remote device.

12 Claims, 4 Drawing Sheets

METHOD AND APPARATUS FOR REMOTELY PLACING A COMPUTING DEVICE INTO A LOW POWER STATE

TECHNICAL FIELD

The invention relates to the field of computing device management. More particularly, the invention relates to a method and apparatus for remotely placing a computing device into a low power state.

BACKGROUND

A business with many computers pays a considerable amount of money for the electricity to power those computers. Not surprisingly, businesses would like to save as much money as possible by utilizing computers with the ability to use less power. Accordingly, an industry trade group established the Advanced Configuration and Power Interface Specification (ACPI), Revision 2.0, Compaq Computer Corporation, Intel Corporation, Microsoft Corporation, Phoenix Technologies Ltd. and Toshiba Corporation, published Jul. 27, 2000, which describes the use of low power states for a computer when it is not in active use.

Another way businesses can save money is by managing their computers remotely across a network. By enabling an administrator to communicate with and control a computer remotely, time and money is often saved by not having to send the administrator to the physical location of the computer. Remote manageability software exists that enables an administrator to place remote devices into a low power state, however, one limitation of such software is that the operating system on the remote device must be in a fully functional and operating state. Other methods of remote device management require the remote device to have additional hardware components that increase the cost of the device.

Accordingly, there exists a need to have a reliable way to remotely place a computing device into a low power state that does not require the operating system to be in a fully functional and operating state, and that does not require additional hardware components be built into the managed device.

BRIEF DESCRIPTION OF THE DRAWINGS

Embodiments of the invention are illustrated by way of example, and not by way of limitation in the figures of the accompanying drawings in which like reference numerals refer to similar elements.

DETAILED DESCRIPTION

A method and apparatus for remotely placing a computing device into a low power state is generally described. In this regard, an enhanced network interface is introduced which can receive an appropriate control signal from a remote electronic device, communicate with a basic input/output system (BIOS) of a host computing device, and place the host computing device into a select one of a number of low power states. In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
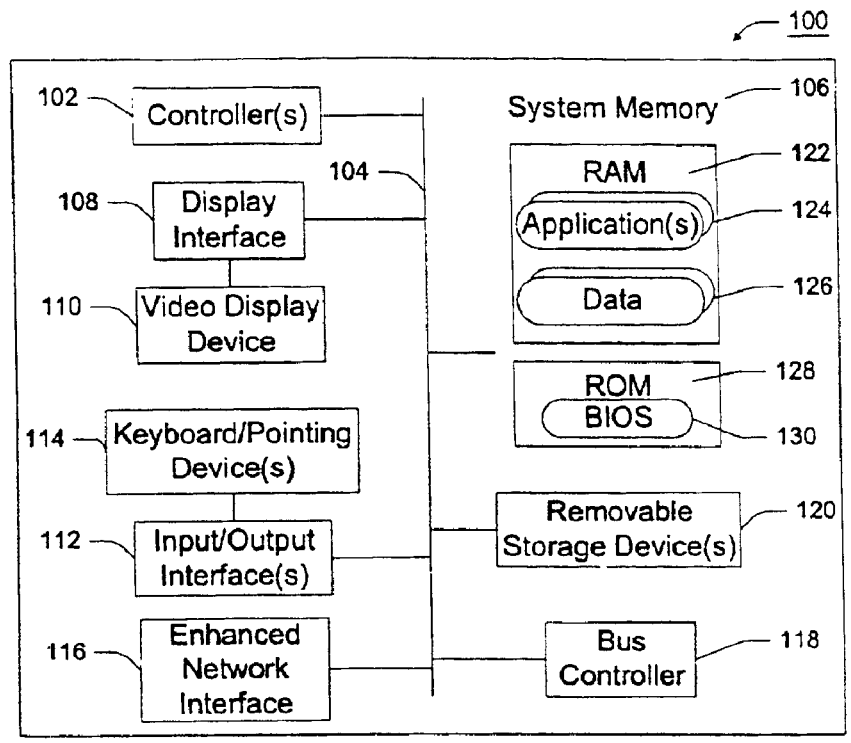
FIG. 1 is a block diagram of an example computing device, incorporating one example embodiment of the teachings of the present invention.

FIG. 1 is a block diagram of an example computing device, incorporating one example embodiment of the teachings of the present invention. Computing device 100 includes controller(s) 102, bus 104, system memory 106, display interface 108, video display interface 110, input/output interface(s) 112, keyboard/pointing device(s) 114, enhanced network interface 116, bus controller 118, removable storage device(s) 120, RAM 122, application(s) 124, data 126, ROM 128, and BIOS 130 coupled as shown in FIG. 1. Computing device 100 includes controller(s) 102 for processing information. An example of a controller is a processor. Computing device 100 further includes bus 104, which is coupled with controller 102, to facilitate the transfer of data within computing device 100.

Random access memory (RAM) 122 and read only memory (ROM) 128, together make up system memory 106 that is coupled with bus 104 for storing information and instructions to be executed by controller 102. System memory 106 also can be used for storing temporary variables or other intermediate information during execution of instructions by controller 102. Typically, applications 124 and data 126 are stored in RAM 122 when they have been or will soon be used by controller 102, because of the quick access capabilities of RAM 122. ROM 128 is typically non-volatile and has the ability to retain its contents while using little or no power. Typically, ROM 128 is used to store a basic input/output system (BIOS) 130, which is a software program that enables computing device 100 to function. BIOS 130 is typically copied to RAM 122 when computing device 100 is first powered on for quick access at any time.

Computing device 100 is also coupled via bus 104 to display interface 108, which in turn is coupled with Video display device 110, such as a cathode ray tube (CRT) or liquid crystal display (LCD), for displaying information to a computer user. Keyboard/pointing device(s) 114, including alphanumeric and other keys and a mouse, a trackball, or cursor direction keys, are typically coupled with bus 104 via an input/output interface 112 for communicating information, command selections, and cursor movement to controller 102.

Computing device 100 further includes enhanced network interface 116 that provides access to a network (not shown in FIG. 1). In one embodiment, enhanced network interface 116 is a network interface card (NIC); however, other network interfaces can also be used. In one embodiment, enhanced network interface 116 identifies a request from a remote device to place computing device 100 into a low power state. In response, enhanced network interface 116 provides BIOS 130 with an indication to enter one of up to a plurality of low power states. In one embodiment, this indication to BIOS 130 is handled by asserting a signal. According to one example embodiment, the signal asserted is the Power Management Event (PME#) signal in the Peripheral Component Interconnect (PCI) Local Bus Specification, Revision 2.2, PCI Special Interest Group, published Dec. 18, 1998. In one embodiment, BIOS 130 responds to the assertion of the PME# signal by one or more of (a) causing the computing device to enter a low power state, (b) turning the computing device off completely, or (c) resetting the computing device.

Bus 104 can be a PCI bus which includes standard signals for transmitting data as well as optional signals such as PME#. Bus controller 118, which can either be incorporated in a chipset or be a separate component, gives coupled components access to bus 104 as needed.

Removable storage device(s) 120, such as a floppy disk drive, CD-ROM drive, or hard drive, provide high capacity storage of applications and data that may be needed by controller 102.

Figure 2:
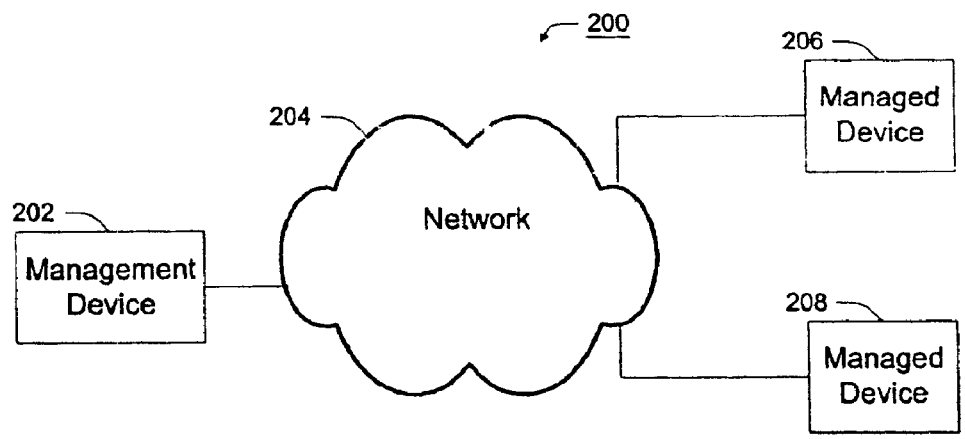
FIG. 2 is a block diagram of an example network environment, according to one example embodiment of the teachings of the present invention.

FIG. 2 is a block diagram of an example network environment, according to one example embodiment of the teachings of the present invention. Network environment 200 consists of management device 202 and managed devices 204 and 206 coupled with network 204. For ease of explanation, only a single management device and two managed devices are illustrated in FIG. 2; however, any number of management devices and any number of managed devices can be used with the invention.

Network 204 provides an interconnection between multiple electronic devices, such as computer systems, printers, facsimile machines, etc. In one embodiment, network 204 is a local area network (LAN) such as those well known in the art. In alternative embodiments, network 204 can be a wide area network (WAN), the Internet, or any other type of network.

In one embodiment, sleep requests take the form of a typical data-packet architecture transmitted across network 204. The data in the packet includes a sleep request code that an enhanced network interface of a managed device is configured to compare to its own sleep request code. If a managed device confirms that the sleep request code received is identical to its own sleep request code, the managed device will initiate the process of entering a low power state as described in greater detail below.

Management device 202 may well be a server or other device that stores one or more sleep request codes that can be used to place managed devices into a low power state. Management device 202 can be, for example, a server controlled by an information technology (IT) organization such that administrators can send a sleep request code from management device 202 to a managed device via network 204.

Managed devices 206 and 208 are coupled with management device 202 via network 204. Managed devices 206 and 208 can receive sleep requests from management device 202 or another server not particularly depicted. Managed devices 206 and 208 can receive sleep requests from the same server or from different servers. Similarly, managed devices 206 and 208 can have the same or different sleep request codes, and may respond to the same requests differently, i.e., entering different low power states.

Figure 3:
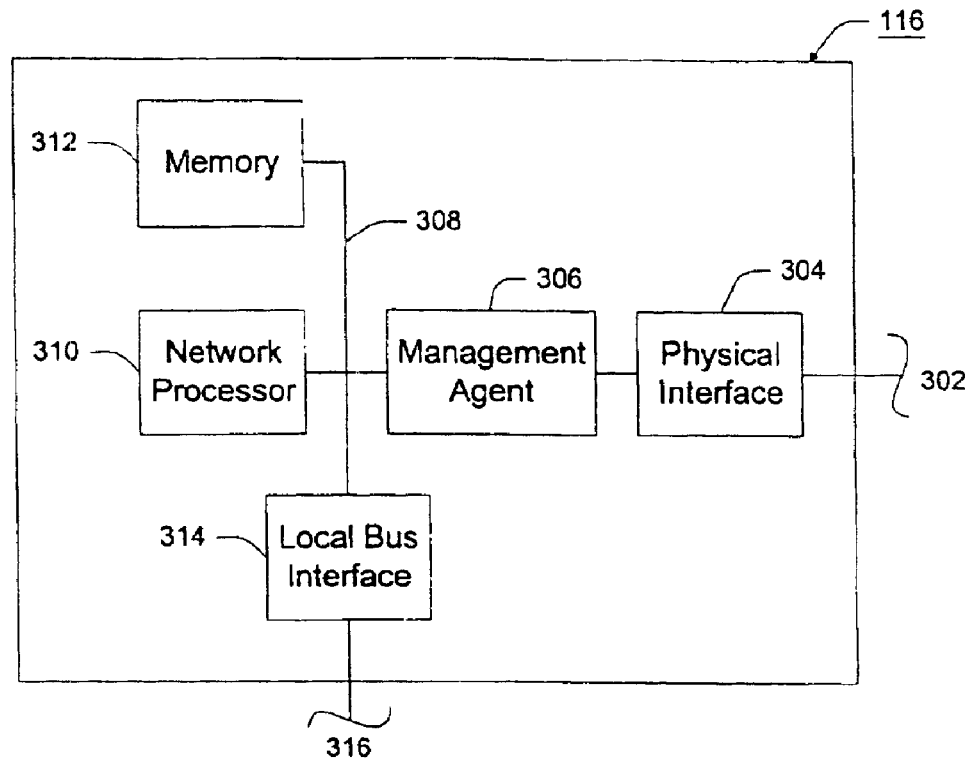
FIG. 3 is a block diagram of an example enhanced network interface, according to one example embodiment of the teachings of the present invention.

FIG. 3 is a block diagram of an example enhanced network interface 116, according to one example embodiment of the teachings of the present invention. As shown, enhanced network interface 116 is coupled with remote devices through network 204 by communication channel(s) 302. Accordingly, physical interface 304 controls the signaling of data received from and sent to communication channel(s) 302. Physical interface 304 receives all data to be sent over communication channel(s) 302 from, and sends all data received over communication channel(s) 302 to, management agent 306.

Management agent 306 is configured to compare all data packets received from Physical interface 304 with its sleep request code as described in greater detail below. Management agent 306 is coupled with internal bus 308 so that it can communicate with the other components of enhanced network interface 116.

Network processor 310 is also coupled with internal bus 308. In accordance with the illustrated embodiment, network processor 310 controls activity on internal bus 308 and performs functions necessary to facilitate data transfer.

Memory 312 is coupled with internal bus 308 and stores instructions for network processor 310 as well as data that is to be acted on by network processor 310. The instructions stored in memory 312 can include firmware, which can be reprogrammed. The instructions can also include the device's sleep request code(s) to be supplied to management agent 306.

Local bus interface 314 controls the electrical signaling with local bus 316, which connects enhanced network interface 116 to the computing device. In one embodiment, local bus 316 is a PCI local bus with a PME# signal.

Figure 4:
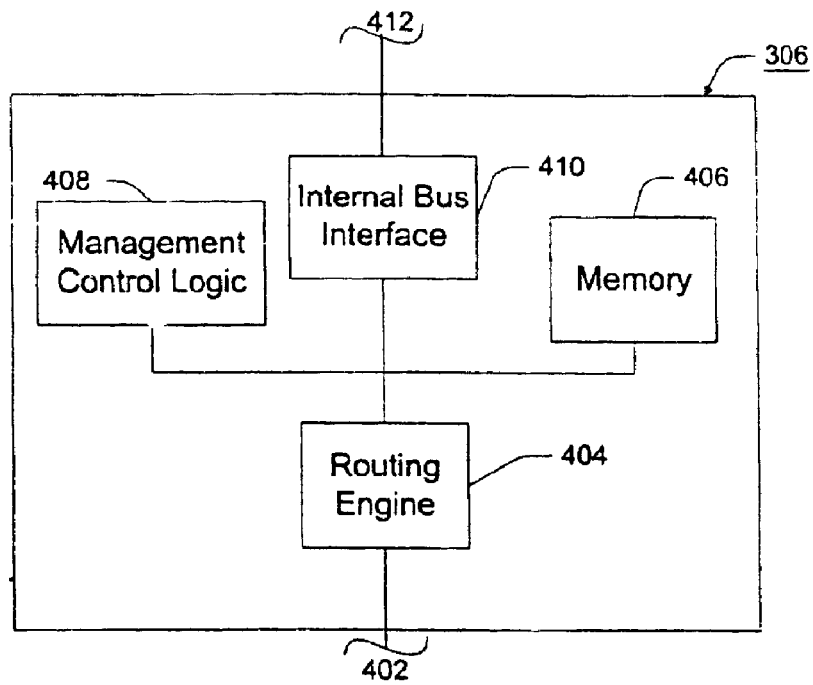
FIG. 4 is a block diagram of an example management agent, according to one example embodiment of the teachings of the present invention.

FIG. 4 is a block diagram of an example management agent 306, according to one example embodiment of the teachings of the present invention. Downstream connection 402 couples management agent 306 with physical interface 304. Routing engine 404 sends data packets to and receives data packets from physical interface 304. After receiving a data packet from physical interface 304, routing engine 404 will route the data packet to memory 406.

Memory 406 temporarily stores data packets received and also the computing device's sleep request code(s). Management control logic 408 compares every data packet received from physical interface 304 to the sleep request code(s) stored in memory 406. In this way, management control logic 408 can authenticate whether a sleep request is valid for this computing device. Management control logic 408 also forwards data packets received and communicates with other components within enhanced network interface 116.

If management control logic 408 determines that a data packet received does not match the sleep request code(s) stored in memory 406, management control logic 408 will send the data packet through Internal bus interface 410 and upstream connection 412 to be stored in memory 312.

If management control logic 408 determines that a data packet received does match a sleep request code stored in memory 406, management control logic 408 will send a communication to local bus interface 314 to assert the PME# signal. Local bus interface 314 then asserts the PME# signal.

Internal bus interface 410 interfaces through upstream connection 412 to internal bus 308. Internal bus interface 410 can send and receive data packets and other communications on internal bus 308.

Figure 5:
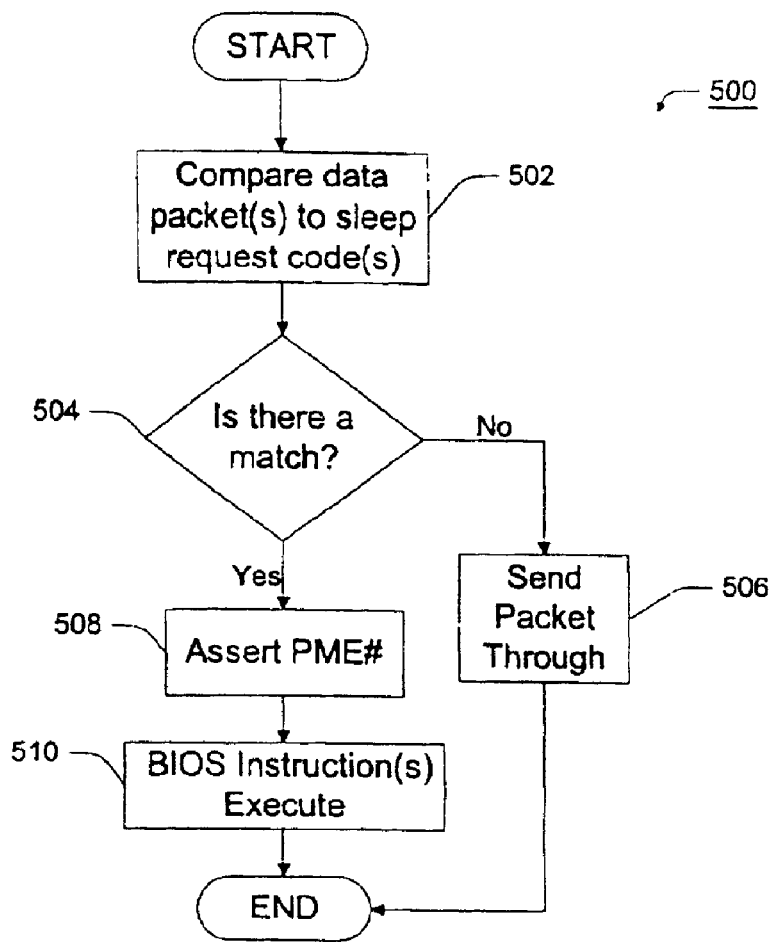
FIG. 5 is a flow chart of an example method of filtering network packets for a sleep request, according to one example embodiment of the teachings of the present invention.

FIG. 5 is a flow chart of an example method of filtering network packets for a sleep request, according to one example embodiment of the teachings of the present invention. All data packets received by enhanced network interface 116 over communication channel(s) 302 are compared (502) by management control logic 408 with a sleep request code.

If management control logic 408 determines (504) that a data packet received does not include a sleep request code, the data packet is sent through (506) internal bus interface 410 and upstream connection 412 to be stored in memory 312.

If management control logic 408 determines (504) that a data packet received does include a sleep request code, management control logic 408 instructs local bus interface 314 to provide an indication to BIOS 130 of the sleep request. According to one example embodiment, local bus interface 314 asserts the PME# signal (508) of the PCI bus to so notify BIOS 130.

In response, BIOS 130 executes instruction(s) (510), which, according to one example embodiment, perform one or more of (a) causing the computing device to enter a low power state, (b) turning the computing device off completely, or (c) resetting the computing device. A detailed example method for responding to a PME# assertion is presented more fully with reference to FIG. 7.

Figure 6:
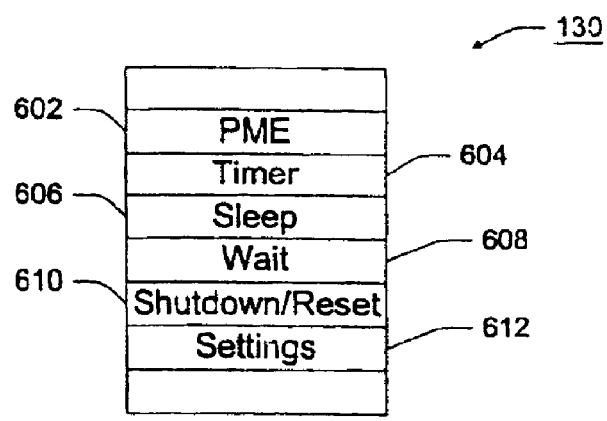
FIG. 6 is a block diagram of an example enhanced basic input/output system (BIOS), according to one example embodiment of the teachings of the present invention.

FIG. 6 is a block diagram of an example enhanced BIOS 130, according to one example embodiment of the teachings of the present invention. PME instructions 602 are executed when the PME# signal is asserted by enhanced network interface 116 as part of a sleep request. There may be other instructions that are executed when the PME# signal is asserted as part of a wake request. According to one embodiment, when executed, PME instructions 602 first clear the PME# signal so that it may be asserted again at a later time. Then, PME instructions 602 read a timer length from settings 612 and then execute timer instructions 604. PME instructions 602 then read a desired low power state from Settings 612 and then execute sleep instructions 606. PME instructions 602 then execute wait instructions 608. In an alternative embodiment, when executed, PME instructions 602 execute shutdown/reset instructions 610.

Timer instructions 604 set and activate a counter or timer that will count down from the timer length that is passed to it. In one embodiment, the timer is a watchdog timer.

Sleep instructions 606 use known methods to communicate to the operating system to enter the desired low power state that is passed to it.

Wait instructions 608 wait for the expiration of the timer. If the operating system has placed the computing device into the desired low power state, the expiration of the timer is ignored. However, if the computing device is not in the desired low power state before the timer expires, then shutdown/reset instructions 610 are executed. Those skilled in the art will appreciate that if the operating system is hung, then it will not be able to place the computing device into the desired low power state.

Shutdown/reset instructions 610 use known methods to either turn the computing device's power supply off (referred to as shutdown) or to momentarily power down and then restart the computing device (referred to as soft-off or reset).

Settings 612 contain values that are chosen by an administrator of the computing device. Settings 612 include, among other settings, settings for timer length and desired low power state.

Figure 7:
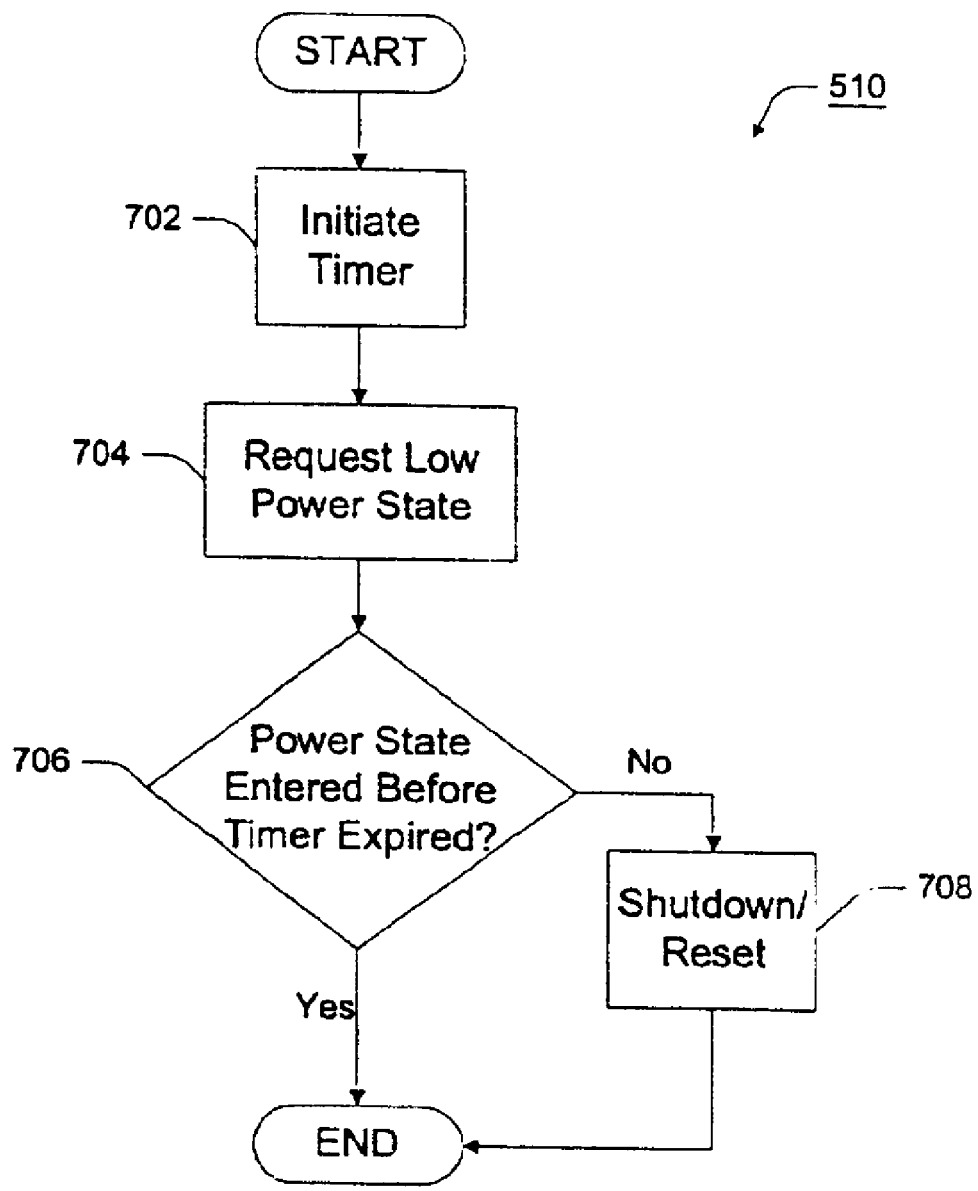
FIG. 7 is a flow chart of an example method of responding to a PME# assertion, according to one example embodiment of the teachings of the present invention.

FIG. 7 is a flow chart of an example method (510) of responding to a PME# assertion, according to one example embodiment of the teachings of the present invention. A timer is initiated (702) by timer instructions 604 of BIOS 130. In one embodiment, the length of the timer is determined by a setting stored within settings 612 of BIOS 130.

A low power state is requested (704) of the operating system by sleep instructions 606 of BIOS 130. In one embodiment, the low power state requested is determined by a setting stored within settings 612 of BIOS 130.

If it is determined (706) by wait instructions 608 of BIOS 130 that the computing device has entered the low power state before expiration of the timer, then no further action is taken.

If it is determined (706) by wait instructions 608 of BIOS 130 that the computing device has not entered the low power state before expiration of the timer, then the computing device is shutdown or reset (708).

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method implemented within a network interface, the method comprising:

asserting a signal that places a host device into a low power state in response to a received request from a remote device, wherein the signal asserted is a PME# signal, and wherein placing a host device into a low power state comprises:

initiating a timer; and requesting an operating system put the host device into a desired low power state.

2. The method of claim 1 further comprising:

determining the low power state into which the host device is to be place by reading a setting stored on the host device.

3. The method of claim 1 further comprising:

waiting for an expiration of the timer; and turning off a power supply.

4. The method of claim 3 further comprising:

authenticating the request from the remote device.

5. A machine-readable medium having stored thereon sequences of instructions that when executed by one or more processors cause the one or more processors to:

initiate a routine when a PME# signal is asserted, wherein the routine comprises:

clearing the PME# signal;

initiating a timer; and requesting an OS to enter a desired low power state.

6. The machine-readable medium of claim 5 further comprising sequences of instructions that when executed cause the one or more processors to determine the desired low power state from a stored setting.

7. The machine-readable medium of claim 6 wherein the timer is a watchdog timer.

8. The machine-readable medium of claim 5 further comprising sequences of instructions that when executed cause the one or more processors to turn off a power supply at an expiration of the timer.

9. A computing device capable of being placed into a low power state remotely, the computing device comprising:

means for receiving a request to enter a low power state from a remote device;

means for asserting a PME# signal;

means for responding to the PME# signal being asserted;

means for executing a sequence of instructions to place the computing appliance in the low power state;

means for initiating a timer; and means for requesting an operating system to place the computing appliance in the low power state.

10. The computing device of claim 9 further comprising:

means for turning off a power supply at an expiration of the timer.

11. The computing device of claim 10 further comprising:

means for determining the low power state from a setting stored on the computing appliance.

12. An apparatus comprising:

a network interface to receive content from a remote device via a coupled data network, wherein the network interface is configured to receive and authenticate requests to enter a low power state; and a BIOS responsive to the network interface to invoke a process that places a host device into a low power state in response to a signal asserted by the network interface, wherein the signal asserted by the network interface is a PME# signal, and wherein the BIOS is configured to set a timer and at an expiration of the timer to turn a power supply off.

* * * * *